(12) United States Patent
Miller et al.

(10) Patent No.: US 6,360,159 B1
(45) Date of Patent: Mar. 19, 2002

(54) EMISSION CONTROL IN AN AUTOMOTIVE ENGINE

(75) Inventors: Paul R. Miller; Mike Barbieri; Chaun He, all of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/589,297

(22) Filed: Jun. 7, 2000

(51) Int. Cl.$^7$ ............................................. F02D 41/14
(52) U.S. Cl. ........................ 701/103; 701/105; 701/101; 123/674
(58) Field of Search ................................. 123/305, 674, 123/675, 703; 701/103–105, 101, 102, 108, 109, 115

(56) References Cited

U.S. PATENT DOCUMENTS

| | | | |
|---|---|---|---|
| 4,085,716 A | 4/1978 | Minami | |
| 4,628,884 A | 12/1986 | Geering et al. | |
| 4,770,760 A | 9/1988 | Noda et al. | |
| 4,789,939 A | * 12/1988 | Hamburg | 123/674 |
| 4,879,656 A | 11/1989 | Quigley et al. | |
| 4,927,517 A | 5/1990 | Mizutani et al. | |
| 5,044,337 A | 9/1991 | Williams | |
| 5,158,062 A | 10/1992 | Chen | |
| 5,284,116 A | 2/1994 | Richeson, Jr. | |
| 5,329,764 A | 7/1994 | Hamburg et al. | |
| 5,426,934 A | 6/1995 | Hunt et al. | |
| 5,486,336 A | 1/1996 | Dalla Betta et al. | |
| 5,551,411 A | 9/1996 | Ward | |
| 5,592,919 A | * 1/1997 | Morikawa | 123/435 |
| 5,598,702 A | 2/1997 | Uchikawa | |
| 5,778,666 A | 7/1998 | Cullen et al. | |
| 5,839,274 A | 11/1998 | Remboski et al. | |
| 5,845,490 A | 12/1998 | Yasui et al. | |
| 5,845,491 A | 12/1998 | Yasui et al. | |
| 5,852,930 A | 12/1998 | Yasui et al. | |
| 6,095,127 A | * 8/2000 | Kolmanovsky et al. | 701/104 |

FOREIGN PATENT DOCUMENTS

JP 8-210171 * 8/1996 ........... F02D/41/40

* cited by examiner

*Primary Examiner*—Andrew M. Dolinar
(74) *Attorney, Agent, or Firm*—Barnes & Thornburg

(57) ABSTRACT

A system and method is provided for controlling noxious emissions, such as NOx, from an internal combustion engine. The invention utilizes a closed loop and an open loop control algorithm to control one or more compensating levers, each compensating lever corresponding to a controllable engine operating parameter that when changed yields a change in the NOx emissions. In the closed loop control approach, the mass flow rate of the NOx is compared to a predetermined threshold to obtain a delta value. This delta value is applied through a PID controller to generate a corresponding change in one or more compensating levers. In the open loop portion, predetermined relationships are generated between one or more compensating levers and changes in a measure of the noxious emissions. Current values for one or more of the levers are compared against nominal values, and the change in these values are evaluated using predetermined relationships to produce a number of NOx delta values. These NOx delta values can be combined into a composite delta value that is applied to the inverse of the predetermined relationship for one of the compensating levers to determine a change command for that lever.

12 Claims, 5 Drawing Sheets

EMISSION CONTROL IN AN AUTOMOTIVE ENGINE

BACKGROUND OF THE INVENTION

The present invention relates to a system and method for controlling an/or compensating noxious emissions from an internal combustion engine. More specifically, the invention relates to the control of NOx emissions from a diesel engine.

It is well known that internal combustion engines generate noxious gases as combustion by-products, among them, the oxides of nitrogen such as NO and $NO_2$, or commonly referred to as NOx. It is certainly desirable from an environmental standpoint to limit the quantity of noxious gases generated during an engine combustion cycle. Over the years, various environmental regulatory agencies have imposed emissions standards on internal combustion engines. These standards have become steadily more stringent over the years.

One common approach to meeting these emission standards involves the use of a catalytic converter connected to the engine exhaust. This catalytic converter essentially purifies the exhaust gas emitted from the engine. Of course, there is a limit to the amount of purification that a typical catalytic converter can achieve, complicated in the case of the desired NOx reduction reactions, by the excess $O_2$ inherent in diesel exhaust gas.

In another approach, a fraction of the exhaust gas can be recycled back to the engine's intake charge (air+EGR) flow using a well-known exhaust gas recirculation (EGR) system. This exhaust gas recirculation approach substantially reduces the NOx component of the exhaust by substituting inert combustion products for some of the excess intake charge (air+EGR) $O_2$, thereby limiting the NOx promoting peak combustion temperature and excess $O_2$ availability for the subsequent combustion process; however, the EGR system can only reduce, but not eliminate all noxious pollutants from the engine exhaust. The inherent tradeoff between NOx formation and particulate formation/oxidation process demands that optimization occur resulting in the needed emission regulation compliance at the best overall performance level for the engine user. The optimization process is complicated by increasing degrees of hardware and software (control) freedom and available to the engine developer coupled with broader and more complex compliance requirements imposed by regulators.

A further approach has been to optimize the air-fuel ratio, which can ultimately optimizes the combustion process. Optimized combustion can significantly reduce the noxious emissions from an internal combustion engine.

While many systems have been developed to address emissions compliance, these systems are frequently obsoleted by new, more stringent emissions regulations. Moreover, the ability for a particular system to consistently reduce noxious emissions is affected by deterioration of the components of that system. Furthermore, the performance of any emissions reduction system is dependent upon the ambient conditions—i.e. fresh air temperature, pressure and humidity.

In view of these difficulties, there remains a consistent need for an emissions control/compensation system and method that can adapt to these changing needs.

SUMMARY OF THE INVENTION

These difficulties are addressed by the present inventive system and method for controlling noxious emissions, such as NOx, from an internal combustion engine. The invention utilizes a closed loop and/or an open loop control algorithm to control one or more compensating levers, each compensating lever corresponding to a controllable engine operating parameter that when changed yields a change in the NOx emissions. The compensating levers can be, for instance, start of injection, variable geometry turbine position, waster gate/exhaust throttle openness, or other engine operating parameters that have an effect on the composition and quantity of pollutants in the engine exhaust.

In the closed loop control approach, the mass flow rate of the NOx is compared to a predetermined target to obtain a delta value. This delta value is applied through a PID controller to generate a corresponding change in one or more of the compensating levers. In certain embodiments, this change value can be supplied directly to pertinent engine control routines within an engine control module (ECM).

In other embodiments, an open loop approach is utilized in which predetermined relationships are generated between one or more controllable engine operating parameters, or compensating levers, and changes in a measure of the noxious emissions. In the open loop approach, a current value for one of the levers is compared against a nominal value, such as a value related to emissions regulatory standards. The change in this value can be evaluated according to a predetermined relationship between the change in the operating parameter and the resulting change in the emission level. This relationship then produces a NOx delta value corresponding to that change in emission level. Thus, with the open loop approach, the current measure of the NOx is essentially inferred from the current values of engine operating parameters. This in contrast to the closed loop approach that relies upon generating an actual measure of the subject emissions and comparing that actual measure with a commanded value.

In one embodiment of the open loop approach, only one such engine operating parameter or compensating lever is sensed and used to generate a NOx delta value. In other embodiments, two or more engine operating parameters can be used to generate two or more emission delta values, based upon corresponding predetermined relationships. In one aspect of the invention, the emission delta values are normalized values so that they are indicative of the effect on emissions without regard to the triggering operating parameter. Thus, in this embodiment, the multiple emission delta values can be combined into a composite delta value. This composite value can then be applied to the inverse of the predetermined relationship for a desired compensating lever to determine a change command for that lever.

It is one object of the invention to provide a system and method for controlling an internal combustion engine to reduce the level of certain pollutants in the engine exhaust. Another object resides in features that control certain engine operating parameters that generate desirable changes in a measure of these pollutants.

One benefit of the system and method of the present invention is that it can combine the benefits of open and closed loop control approaches. Another benefit is that the inventive system can account for degradation of engine components and can be readily modified to account for more stringent emissions regulations.

Other objects and benefits of the invention can be discerned from the following written description and accompanying figures.

DESCRIPTION OF THE PREFERRED EMBODIMENTS

Figure 1:
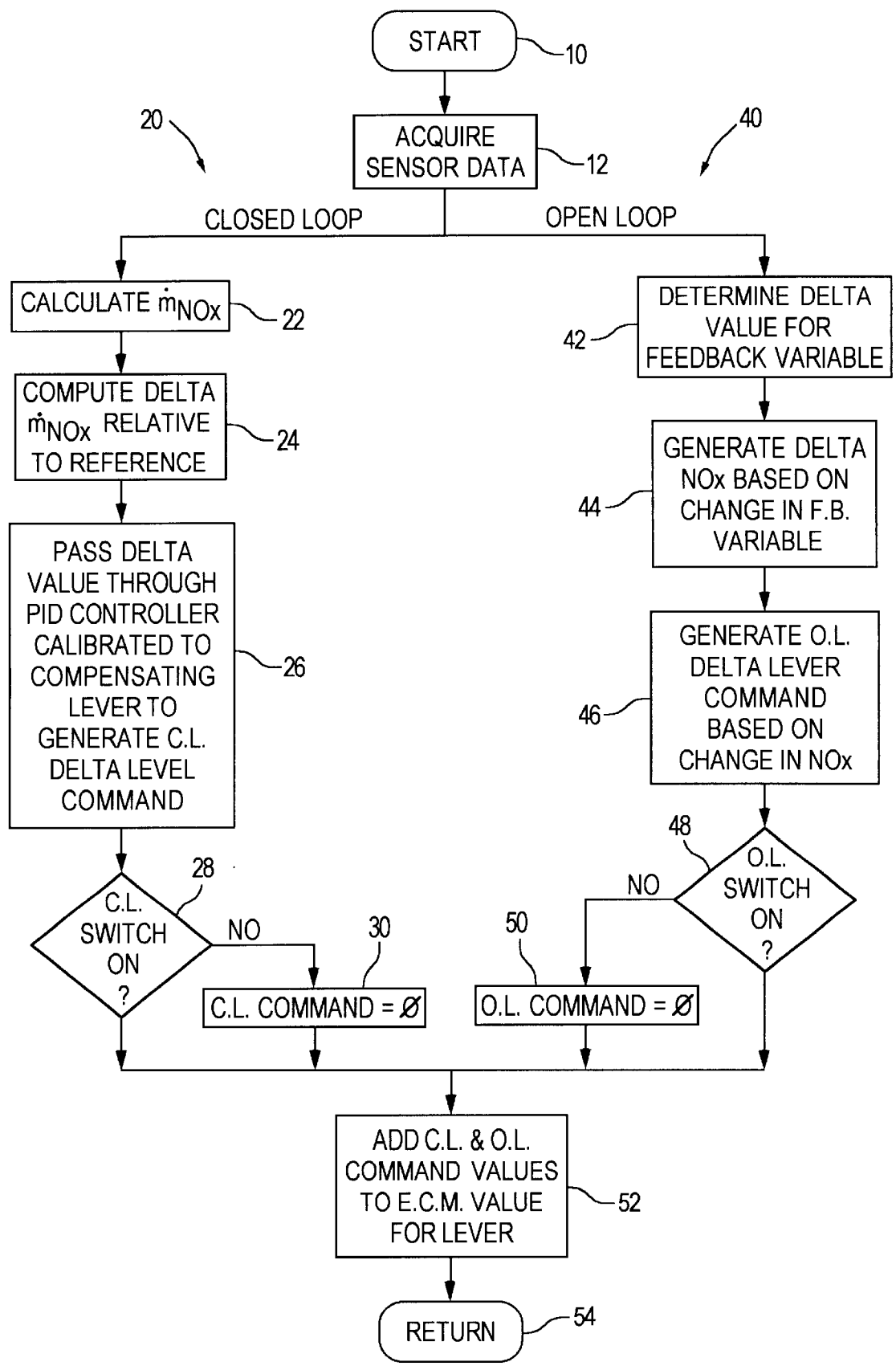
FIG. 1 is a flowchart depicting the steps of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

The present invention contemplates a system and method relying upon both open loop and/or closed loop control strategies. Under both strategies, a "mission goal" dictated process is executed to determine a primary compensating lever (control/feedback variable). This mission-dictated process adjusts the compensating lever to bring the specific emission component back into compliance in a way that best serves the mission goal. In the preferred embodiment, these mission goals can include fuel economy, long life or transient performance. In a further aspect of certain embodiments of the invention, the compensating levers or control/feedback variables, can include start of injection; charge (air+EGR) mass, $O_2$ level or temperature, variable geometry turbine position, or wastegate/exhaust throttle flow area. Of course, other control/feedback variables can be utilized.

The flowchart in FIG. 1 illustrates one preferred embodiment of the emission control system of the present invention. It is understood that the steps of this flowchart can be implemented by software within the engine control module (ECM), or a separate emissions control module that communicates with the ECM. Similarly, the steps and systems of the present invention can be implemented by a combination of electronics and software.

As the flowchart illustrates, the steps of the compensation method begin at a starting point 10, which can typically be initiated when the engine is started. In the first step 12, data from the various engine and condition sensors is acquired. This data includes ambient condition values, such as temperature and pressure, as well as engine operating parameters. In accordance with one preferred embodiment of the invention, the engine operating data is obtained from various sensors throughout the engine, such as sensors for NOx concentration, fresh air mass flow (MAF) sensor, intake manifold temperature and engine speed sensor. In addition, the data obtained in step 12 can include fuel mass flow, percent fueling and engine torque. The engine torque can be acquired from a model-based estimate as a function of engine speed and fuel quantity, for instance, or from an actual torque sensor.

The present invention contemplates obtaining data from a NOx sensor. The typical sensor of this type measures exhaust $O_2$ and NOx. A well known NOx sensor relies upon an electrochemical or catalytic reaction that generates a current, the magnitude of which is indicative of the concentration of the subject gas present in the exhaust. In the most preferred embodiment the NOx sensor generates a signal that measures the molar concentration of the gas within the exhaust.

Figure 2:
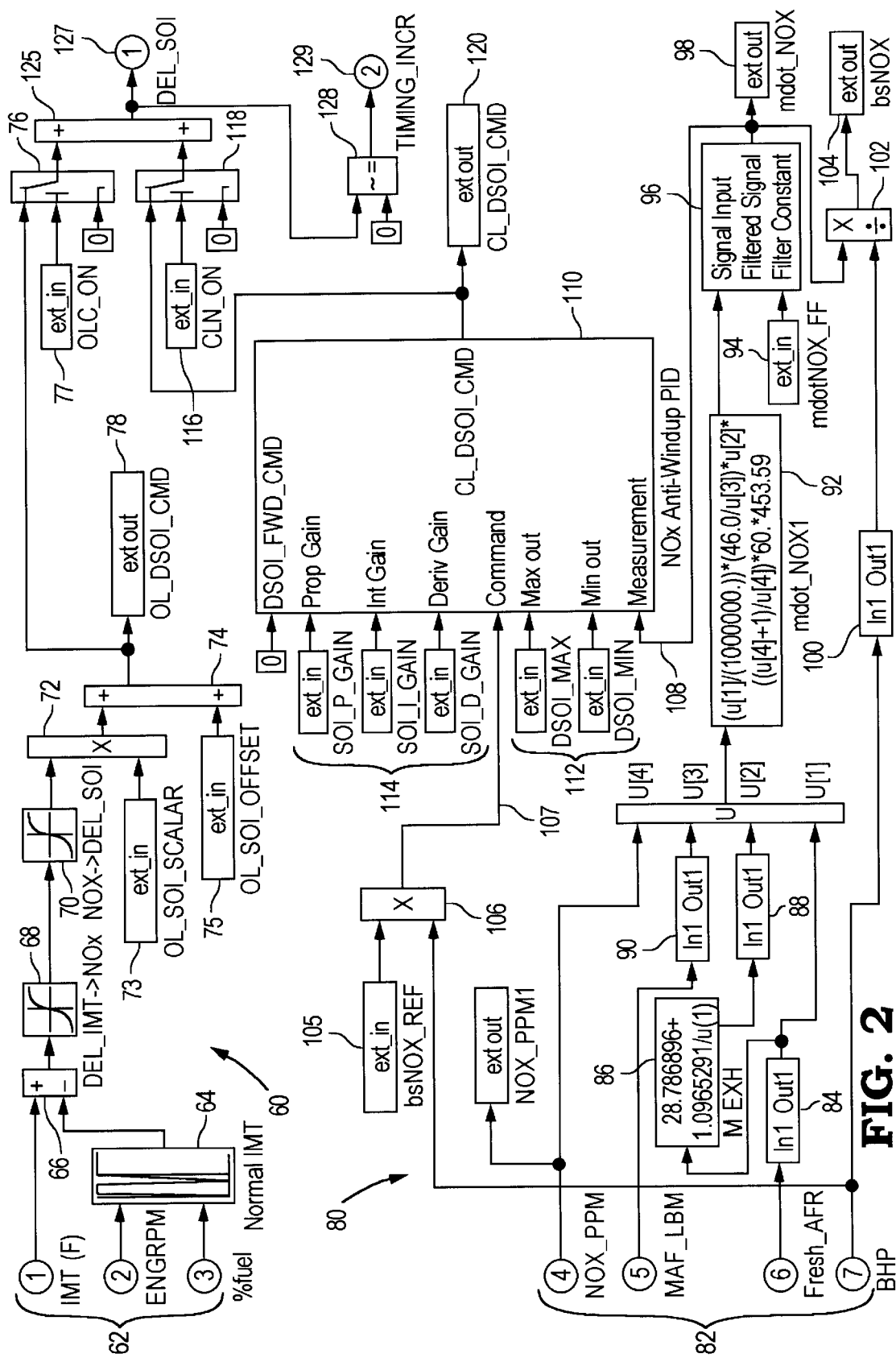
FIG. 2 is a mathematical block diagram providing further detail to the flowchart shown in FIG. 1.

As indicated above, the method according to the present invention contemplates both a closed loop process 20 and an open loop process 40 for controlling the compensation of the subject exhaust gas, in this case NOx. The closed loop segment 20 of the flowchart of FIG. 1 proceeds from step 12 to step 22 in which the mass flow rate of the NOx gas is calculated. Referring to FIG. 2, one specific approach for calculating the NOx mass flow rate of relies upon certain input data 82. Specifically, the mass flow calculation utilizes the NOx sensor value "NOx_PPM", which corresponds to the molar concentration of NOx, "MAF_LBM", which corresponds to the fresh air mass flow, and "Fresh_AFR" which corresponds to the ratio of fresh air mass flow and fuel mass flow rate. The sensor values "MAF_IBM" and "Fresh_AFR" are passed through modules 90 and 84, respectively, which operate on the input signals to eliminate a zero value.

The output from module 84 is then provided to a calculation module 86, which is used to calculate the molecular weight of the exhaust gas. The calculation module 86 applies a pre-determined formula to obtain a value "M_EXH", which value is sent through a module 88 to prevent a divide-by-zero problem in subsequent calculations. These values are then fed to a mass flow calculation module 92. As illustrated in FIG. 2, this module 92 applies a specific equation to the input data to calculate the engine exhaust NOx flow rate "mdotNOX1". The output of the module 92 is passed through a filter 96 to which a filter constant 94 is applied. The result is at output 98, namely "mdot_NOx", which is the filtered mass flow rate of the NOx in the engine exhaust.

Figure 3:
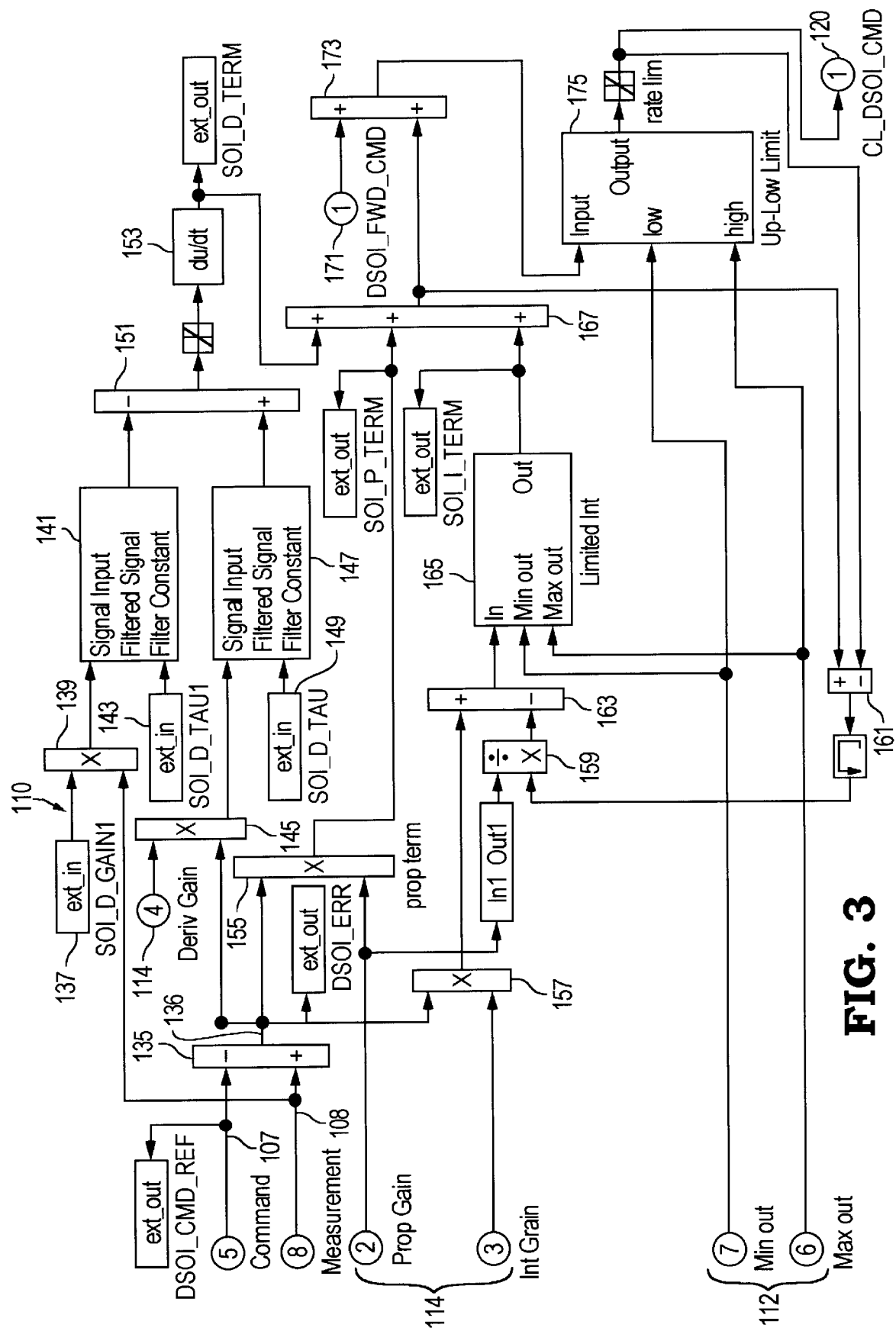
FIG. 3 is a mathematical block diagram of a PID component of the system depicted in FIG. 2.

Returning to FIG. 1, after the mass flow rate of the subject gas is then calculated, the method proceeds to step 24 in which an error or delta value is computed based upon the calculated mass flow of the NOx relative to a pre-determined reference (or target) value. Details of the step are illustrated in FIGS. 2 and 3. As shown in FIG. 2, the conditioned output of filter 96 is provided as measurement input 108 to a proportional-integral-derivative (PID) controller 110. In addition, the engine brake horsepower (BHP) and brake specific NOx reference values are used to generate a command value of the NOx mass flow rate 107 to the PID controller 110. More specifically the brake horsepower is obtained from logic that estimates the engine brake horsepower from engine speed, fuel rate and other sensed or inferred torque influencing conditions (or directly from a torque sensor, if present) in one of the inputs 82 to the closed loop system 80 showed in FIG. 2. As illustrated in the figure, the BHP value can be passed through a module 100 to prevent a divide- by-zero condition. This BHP value is then applied to a multiple/divide module 102. The other input of the multiple/divide module 102 is the output 108 corresponding to the mass flow rate of the NOx. The result of this divide step is a brake specific NOx output value 104. At this point, both the NOx mass flow rate output 98 and the brake specific NOx value 104 can be provided to other engine control routines within the ECM.

More specific to the computation step 24 of the flowchart in FIG. 1, the estimated BHP value is applied to a multiplier module 106. This module 106 also receives a reference value 105, namely "bsNOx_REF" (brake specific NOx reference (g/hp.hr)), as input. This value 105 can be obtained from a pre-determined reference map stored within a memory of the ECM for instance. Thus, the output 107 from the multiplier module 106 constitutes a reference or calculated mass flow rate for the NOx, which can be compared against the actual calculated NOx mass flow rate based on sensed data, represented by the measurement signal 108 provided to the PID controller 110.

Referring now to FIG. 3, the two inputs 107 (corresponding to the reference value), and 108 (corresponding to the actual value) are provided to a summing module 135, which generates a delta mass flow rate value 136. In other words, step 24 of the flowchart in FIG. 1 compares the actual NOx mass flow rate to a commanded mass flow rate based upon the current engine operating conditions. The premise behind this comparison is that any non-zero delta value means that the NOx emissions fall outside the commanded value for the current engine performance and condition. Thus, a non-zero delta value means that some change in the engine operating parameters is necessary to bring the NOx emissions back into compliance.

This action occurs in step 26 of the flowchart in FIG. 1. More specifically, this delta value is passed through a PID controller that is calibrated to a specific compensating lever. The PID controller then generates a closed loop delta value to be added to the specific lever command. In accordance with the present invention, a compensating lever is a particular engine operating parameter, which when changed can impact the mass flow rate of the subject noxious gas (in this case NOx) in the engine emissions.

For example, in the preferred embodiment, the compensating levers can include fuel mass, oxygen charge (air+EGR) mass, variable geometry turbine position, wastegate/exhaust throttle flow area, start of injection (SOI) and/or EGR flow rate et al. The lever can be pre-determined based upon the particular mission goal to be satisfied. For instance, if the mission goal is for fuel economy and the NOx emissions are too high, the most effective compensating lever toward contributing to the mission goal is likely to be the EGR flow rate, provided other limiting conditions aren't imposing a limitation on changes from the current. In this instance, increasing the EGR flow will decrease the NOx emissions with the least fuel economy penalty. Alternatively, where fuel economy is the mission goal and NOx emissions are too low, advancing the start of injection closer to optimum can increase the NOx emission mass flow rate back to the acceptable reference value while maximizing fuel economy.

If the mission goal pertains to long engine life and emissions are too high, the SOI may be retarded with the EGR being maintained at its nominal level to minimize system deteriorating effects of EGR usage. Conversely, when emissions are too low, the EGR flow rate can be decreased, again to minimize system-deteriorating effects of EGR usage, while the start of injection is maintained at its nominal level. Further, if the mission goal is to optimize transient performance and NOx emissions are too high, the SOI can be retarded, so as to minimize the transient performance preparedness deterioration associated with EGR usage. Again, conversely a decrease in the EGR flow rate is prescribed where emissions are too low and the goal is to optimize transient performance. Of course, it is contemplated that other compensating levers can be utilized where their effect on emissions can be readily quantified.

In the specific illustrated embodiment, the start of injection (SOI) is the compensating lever used to control the NOx emissions rate for the closed loop component 80. In the preferred embodiment, step 26 of the flowchart in FIG. 1 is accomplished by the PID controller 110 shown in FIG. 2, and illustrated in a normal detailed block diagram in FIG. 3. The PID controller 110 receives the measurement value 108 for the emissions mass flow rate, as well as the pre-determined command value 107 corresponding to an optimum mass flow rate. As previously discussed, the two input signals 107 and 108 are used to generate a delta value 136. The purpose then, of the PID controller 110 is to compensate that delta value, or, in other words, to reduce that delta value 136 to zero. It has been found that a proportional-integral-derivative controller provides a good means for correlating this NOx mass flow rate delta value to a delta command to be applied to a compensating lever.

In addition to the inputs 107 and 108, the PID controller 110 receives inputs 112 corresponding to maximum and minimum limits to the delta values that can be applied to the particular compensating lever. In the present case, since the compensating lever is the start of injection, the maximum and minimum values are "DSOI_MAX" and "DSOI_MIN". The PID controller 110 also receives three gain inputs 114, corresponding to the proportional gain, integral gain and differential gain to be applied.

The internal elements of the PID controller 110 can be of known configuration. The detail block diagram of FIG. 3 is provided for illustrative purposes. The proportional element of the controller 110 is encompassed by the multiply component 155. This component receives the proportional gain value of the inputs 114 and multiplies that value by the delta value 136. The result of this multiply is the value "SOI_P_TERM". The integral element of the PID controller 110 receives the delta value 136 and multiplies that in multiply module 157 by the integral gain from the inputs 114.

The output of this multiply module is fed to a summing module 163, which receives an additional input from the integral feedback loop. This integral feedback loop obtains a signal from the summing module 167 and subtracts the ultimate output of the PID controller, namely the closed loop delta SOI command signal 120. This subtraction occurs in module 161. The result of this subtraction is fed back to a multiply/divide module 159 in which the result is divided by the proportional gain input value. The result of the addition in the summing module 163 is fed to a min/max filter 165, which yields an output "SOI_I_TERM".

Finally, the derivative element of the PID controller 110 receives the measurement value 108 and multiplies that value by a pre-determined filter gain 137 in a multiply module 139 the output of this multiplication is fed to a filter 141 which also receives a filter time constant input 143. The output of this filter 141 is fed to a summing module 151. The summing module 151 receives an additional input for the delta value 136. The delta value 136 is fed to a multiplier where it is multiplied by the derivative filter gain of the inputs 114. This product is fed to an additional filter 147, which receives another input 149 corresponding to a filter time constant. The output of this second filter 147 is then provided to the summing module 151 from which the output of the filter 141 is subtracted. The various filter values 137, 143 and 149 can be pre-determined to condition the derivative component of the PID output. The filter values can specifically condition the derivative value based on the mission-specific goals discussed above.

The result of this subtraction passes through a derivative module 153 to the summing module 167. Thus, the summing module 167 receives the three SOI_TERMS corresponding to the proportional, derivative and integral elements. As previously explained, the output of this summation is fed back through the integration loop to summing module 161. In addition, this result is fed to another summing module 173. This module 173 receives an additional input 171 corresponding to a pre-determined SOI delta offset command. Nominally, this command value is zero as reflected at the input of PID 110 shown in FIG. 2.

The output of this summing module 173 is provided to a final limit filter 175. The output from this limit filter is the closed loop delta SOI command 120. Thus, the closed loop portion 80 of the system shown in FIG. 2 generates a value corresponding to a change in the start of ignition command provided to the engine control module. This change value can either advance or retard the start of ignition for the engine, depending upon the particular mission protocol. The P, I & D gain values of the inputs 114, as well as the filter inputs 137, 143 and 149, can be calibrated based upon the particular mission goal to be met by the closed loop control system.

Returning to FIG. 2, it could be seen that the output 120 ("CL_DSOI_CMD") is sent to switch 118. The state of the switch is determined by an input signal 116. This signal 116 is "on" if closed loop correction is requested by the emission compliance manager, or is "off" if closed loop correction is not deemed necessary by the emission compliance manager. In the embodiment shown in FIG. 2, the closed loop delta SOI command is fed to a summing module 125 where that command can be combined with a similar command generated by the open loop portion of the system. Alternatively, only the closed loop system can be used to provide emission correction. In this instance, the output 120 would be fed directly to the output 127 of the system corresponding to the final SOI delta value ("DEL_SOI"). This output 127 can then be provided to the appropriate engine control routines within the ECM to advance or retard the start of injection. This delta command can also be fed to a zero-comparison module 128 to generate an SOI increment enable signal 129 to inform the ECM whether the start of injection needs to be changed or not.

While one embodiment of the invention contemplates utilizing the closed loop system only, the most preferred embodiment combines the closed loop component 80 with an open loop component 60. The open loop component 60 implements the steps 40 of the flowchart in FIG. 1. In the open loop system, the first step is to acquire appropriate sensor data in step 12. As shown in FIG. 2, this sensor data can include the intake manifold temperature, the engine speed and the percent of fuel provided to the engine (i.e. current fuel divided by maximum fuel at the current engine speed).

Once the sensor data has been obtained, the first substantive step of the open loop element 40 is to determine a delta value for the particular chosen feed back variable. In the embodiment illustrated in FIG. 2, the chosen feedback variable is the intake manifold temperature (IMT). This feedback variable corresponds to a sensed condition of the engine operation that is indicative of, or has some relationship to, the noxious component of the engine exhaust. Thus, in the illustrative embodiment it is known that variations in the intake manifold temperature can yield different NOx content in the engine exhaust.

This feature of the invention capitalizes on the relationship between the variation in this engine operating parameter and the variation in the emission rate of the NOx. Thus, the first substantive step 42 of the open loop method 40 requires a determination of this delta value. This determination is illustrated in more detail in FIG. 2. In particular, a calculation module 64 calculates an expected or normal intake manifold temperature based upon the current engine speed and percent fuel values from the inputs 62. This normal IMT value can be obtained from a table lookup or a pre-determined equation. The specific normal IMT value from module 64 is provided to a summing module 66 where it is subtracted from the actual IMT sensor value of the input 62.

In the next step 44 of the open loop process 40, a formula is applied to generate a delta NOx value based upon the change in the particular feedback variable. This step is incorporated into module 68, which receives the output from the summing module 66. The module 68 can implement a table lookup or equation driven determination. The module relies upon a pre-determined relationship, stored in memory, between the change in the selected engine operating parameter, in this case IMT, and an expected change in the emissions output rate, in this case NOx.

Once this delta NOx value has been calculated, a delta command for a pre-determined open loop compensating lever can be generated in step 46 (FIG. 1). The module 70 of the mathematical block diagram of FIG. 2 represents this step. In the specific illustrative embodiment, the compensating lever is again the start of injection (SOI). Thus, the module 70 applies the output of module 68 to a pre-determined relationship between the delta NOx and a delta SOI. The module 70 of the present invention capitalizes on the relationship between a change in the compensating lever, in this case SOI, and changes in the emission output level of the NOx. The module 70, thus, operates as an inverse to the module 68. The output from the module 70 is fed to a multiplier 72 where the delta SOI value is multiplied by a pre-determined scaler input 73. The results of this multiplication is fed to a summing module 74 in which a pre-determined open loop SOI offset value 75 can be applied. The value 73 and 75 can be pre-determined based upon the mission goals.

The output of the summing module 74 is the open loop delta SOI command 78. As with the closed loop system, the open loop delta command is only utilized if the open loop switch 76 is on. Thus, the conditional step 48 of the flowchart in FIG. 1 looks to the input signal 77 to determine whether the engine operator has activated the open loop compensation component. If not, then in step 50 the open loop delta command is set to zero, in the same way that the closed loop command was set to zero in step 30 in the event the closed loop switch was off. On the other hand, if the open loop switch is on, switch 76 passes the command "OL_DSOI_CMD" to the sending module 125 where it is combined with the like closed loop command. In this illustrative embodiment, the final output command 127 corresponding to the change in start of injection is the composite of the open loop and closed loop values, as combined in step 52 of the flowchart. The routine returns at step 54 to the data acquisition step 12, so the routine cycles continuously during the operation of the engine.

In the specific embodiment, the open and closed loop systems operate on the same compensating lever—in this instance, the start of injection. Of course, other compensating levers can be utilized within both the open loop and closed loop components 60 and 80, respectively. Moreover, the open loop system 60 could utilize a different compensating lever from the closed loop system 80.

The relationship exploited in the modules 68 and 70, and in the steps 44 and 46 of the open loop method 40, rely upon relationships between various engine operating parameters and their impact on the emissions level. These relationships are shown graphically in FIGS. 4–6. In particular, these graphs depict three different engine-operating parameters, namely intake oxygen fraction, intake charge (air+EGR) temperature change, and change in start of injection, as they pertain to a "Z" function of NOx. This "Z" function is a normalized NOx emission ratio, namely the predicted NOx emission divided by a reference value. These "Z" functions represent the relationship between the NOx emissions and variations in the selected operating parameters. Thus, referring to step 44 or component 68, a "Z" function can be applied to the delta value for the feedback variable to obtain the NOx emission ratio. The inverse of this step is applied in module 70 to derive a delta command for application to the ECM.

Figure 4:
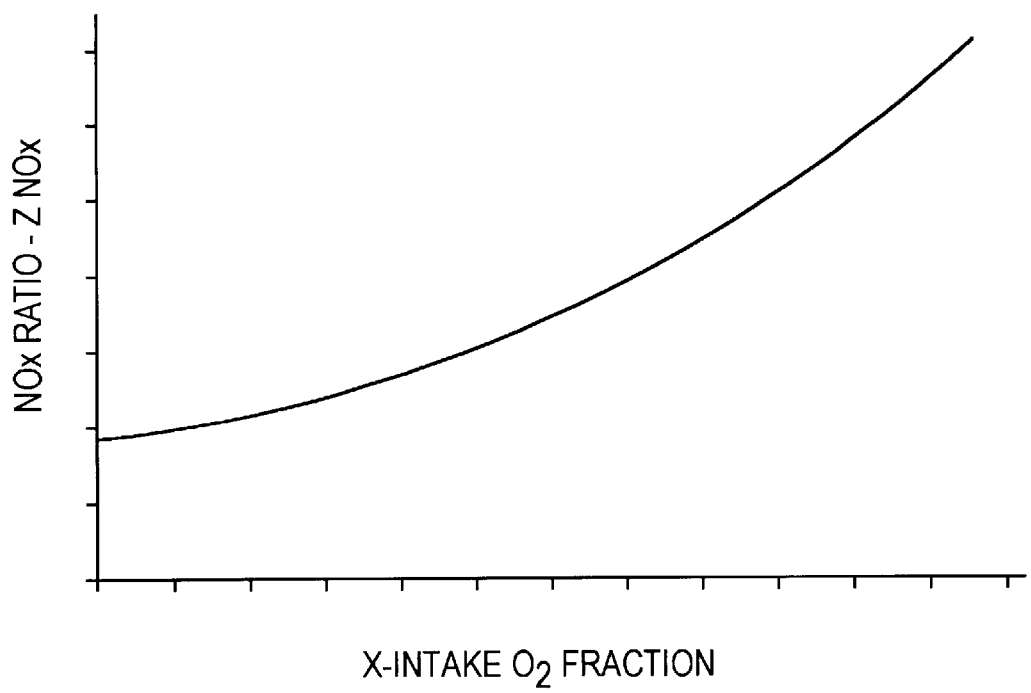
FIG. 4 is a graph of a compensation function in relation to a control/feedback variable, in this case the intake oxygen fraction, in accordance with one embodiment of the present invention.
Figure 5:
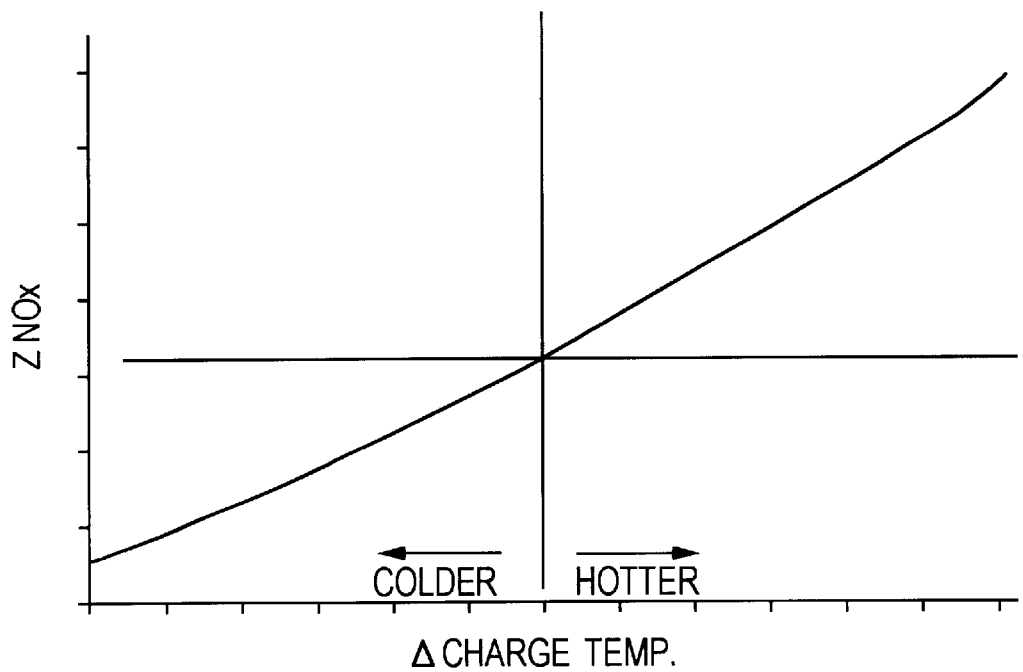
FIG. 5 is a graph of a predetermined relationship between the change in the operating parameter and the resulting change in emission level, in this case the change in the charge (air+EGR) temperature.
Figure 6:
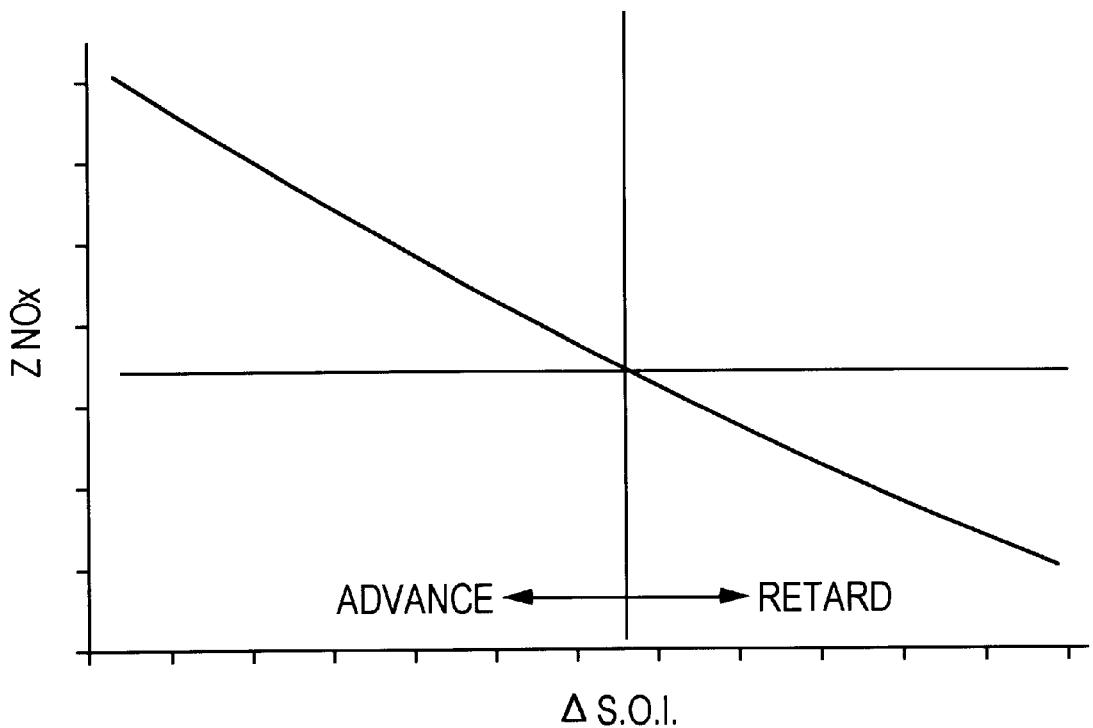
FIG. 6 is a further compensation function in relation to the change in start of injection, in accordance with one embodiment of the present invention.

Since the "Z" functions are a normalized value, they are nearly, in effect, independent of any engine operating parameter. Thus, a "Z" value can be calculated based upon one engine operating parameter, such as intake oxygen fraction as depicted in FIG. 4, and that same "Z" function value can be applied in the inverse to a different engine operating parameter, such as start of injection as depicted in FIG. 6.

One significant benefit of this aspect of the invention is that a composite "Z" function value can be generated based upon "Z" function results for a number of engine operating parameter values. For instance, changes in each of the sensor input operating parameters of FIGS. 4–6 can yield a specific "Z" function value. These resulting three "Z" function values can be combined into a composite "Z" value. The inverse of this composite value is then applied to one of the curves of FIGS. 4–6 to yield a change command for the specified input parameter. For instance, the composite value can be applied to the curve of FIG. 6 to determine whether the start of injection is advanced or retarded and by how much. With his approach, the open loop compensation system 60 can be modified to provide an additional summing module to sum the results of multiple modules 68 and 70 operating on different input parameters.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A method for controlling an internal combustion engine to minimize the exhaust of NOx arising from the combustion of fuel in the engine, comprising the steps of:
   generating a plurality of command inputs for controlling the combustion of fuel in the engine;
   acquiring data from sensors indicative of operating conditions of the engine;
   using the data to measure a mass flow rate of NOx in the exhaust;
   determining a delta value equal to the difference between the measure of the mass flow rate of NOx and a reference value;
   generating a closed loop command value to change a pre-determined one of the command inputs according to a pre-determined relationship correlating the delta value to changes in the pre-determined one of the command inputs to reduce that difference;
   modifying the pre-determined one of the command inputs by the closed loop command value; and
   providing the plurality of command inputs, including the modified one of the inputs, to a controller operable to control the combustion of fuel in the engine.

2. The method for controlling an internal combustion engine according to claim 1, wherein:
   the data from the sensors includes the current brake horsepower of the engine; and
   in the step of determining a delta value, the reference value is a mass flow rate of NOx as a function of current brake horsepower based on regulated pollution limits.

3. The method for controlling an internal combustion engine according to claim 1, wherein:
   the pre-determined one of the command inputs is a start of injection of fuel into the cylinders of the engine; and
   in the step of generating the closed loop command value, the command value is an increase or decrease in the start of injection.

4. The method for controlling an internal combustion engine according to claim 1, wherein:
   the data from sensors includes at least a first feedback variable indirectly indicative of the mass flow rate of NOx in the engine exhaust; and
   the method includes the additional steps of;
   determining the difference between the data for the first feedback variable to a reference value;
   applying a first relationship to the difference to generate a first delta value indirectly indicative of a change in the mass flow rate of NOx as a function of a change in the first feedback variable;
   applying a second relationship to the delta value to generate an open loop command value to change the pre-determined one of the command inputs to reduce the delta value; and
   modifying the pre-determined one of the command inputs by the open loop command value.

5. The method for controlling an internal combustion engine according to claim 4, further comprising the step of combining the closed loop command value and the open loop command value, whereby the pre-determined one of the command inputs is modified by the combination of both command values.

6. The method for controlling an internal combustion engine according to claim 4, further comprising the step of selecting one of the closed loop command value and the open loop command value, whereby the pre-determined one of the command inputs is modified by the selected one of the command values.

7. The method for controlling an internal combustion engine according to claim 6, wherein the step of selecting including selecting both of the command values, whereby the pre-determined one of the command inputs is modified by both command values.

8. The method for controlling an internal combustion engine according to claim 4, wherein the additional steps include:
   determining the difference between the data for a second feedback variable to a corresponding reference value;
   applying a third formula to the difference to generate a second delta value indirectly indicative of a change in the mass flow rate of NOx as a function of a change in the second feedback variable;
   prior to the step of applying a second formula, combining the first and second delta values to form a composite value; and
   applying the second formula to the composite value.

9. A method for controlling an internal combustion engine to minimize the exhaust of a pollutant gas arising from the combustion of fuel in the engine, comprising the steps of:

generating a plurality of command inputs for controlling the combustion of fuel in the engine;

acquiring data from sensors indicative of operating conditions of the engine, the data including at least a first feedback variable indirectly indicative of a measure of the pollutant gas in the engine exhaust;

determining the difference between the data for the first feedback variable to a reference value;

applying a first formula to the difference to generate a first delta value indirectly indicative of a change in the measure of the pollutant gas as a function of a change in the first feedback variable;

applying a second formula to the delta value to generate an open loop command value to change a pre-determined one of the command inputs to reduce the delta value; and modifying the pre-determined one of the command inputs by the open loop command value.

10. The method for controlling an internal combustion engine according to claim 9 comprising the additional steps of:

determining the difference between the data for a second feedback variable to a corresponding reference value;

applying a third formula to the difference to generate a second delta value indirectly indicative of a change in the measure of the pollutant gas as a function of a change in the second feedback variable;

prior to the step of applying the second formula, combining the first and second delta values to form a composite value; and applying the second formula to the composite value.

11. A method for controlling an internal combustion engine to minimize the exhaust of a pollutant gas arising from the combustion of fuel in the engine, comprising the steps of:

determining at least two controllable engine operating parameter that when changed cause a change in a gas component of the engine exhaust;

deriving a pre-determined relationship between changes in the operating parameters and changes in a measure of the gas component;

sensing current engine operating conditions, including a current measure of one of the operating parameters;

comparing the current measure of the one of the operating parameters with a pre-determined nominal value to generate a parameter delta value;

applying the parameter delta value to the pre-determined relationship for the one of the operating parameters to obtain a gas component delta value;

applying the gas component delta value to the pre-determined relationship for another of the at least two operating parameters to obtain a command value corresponding to a commanded change in the other operating parameter; and applying the command value to the other operating parameter provided to an engine control routine.

12. The method for controlling an internal combustion engine according to claim 11, wherein:

the step of comparing the current measure includes comparing the current measure of two or more of the operating parameters with corresponding nominal values to generate a plurality of parameter delta values;

the step of applying the parameter delta value includes applying each of the plurality of parameter delta values to a corresponding pre-determined relationship to obtain a plurality of gas component delta values; and the step of applying the gas component delta value includes applying a composite delta value that is a combination of the plurality of gas component delta values.

* * * * *

UNITED STATES PATENT AND TRADEMARK OFFICE
CERTIFICATE OF CORRECTION

PATENT NO. : 6,360,159 B1
DATED : March 19, 2002
INVENTOR(S) : Paul R. Miller et al.

It is certified that error appears in the above-identified patent and that said Letters Patent is hereby corrected as shown below:

<u>Title page,</u>
Item [75], after "Mike Barbieri;" please delete "Chaun He" and insert -- Chuan He --.

Signed and Sealed this

Twenty-fifth Day of June, 2002

Attest:

Attesting Officer

JAMES E. ROGAN
*Director of the United States Patent and Trademark Office*